Oct. 6, 1925.

B. F. SEYMOUR 1,556,165

VEHICLE BODY SUSPENSION

Filed Dec. 14, 1920

Inventor
Benjamin F. Seymour

By
W. H. Byrne
Attorney

Patented Oct. 6, 1925.

1,556,165

UNITED STATES PATENT OFFICE.

BENJAMIN F. SEYMOUR, OF INDIANAPOLIS, INDIANA.

VEHICLE BODY SUSPENSION.

Application filed December 14, 1920. Serial No. 430,694.

*To all whom it may concern:*

Be it known that I, BENJAMIN F. SEYMOUR, a citizen of the United States, residing at Indianapolis, in the county of Marion and State of Indiana, have invented certain new and useful Improvements in Vehicle Body Suspensions; and I do hereby declare the following to be a full, clear, and exact description of the invention, such as will enable others skilled in the art to which it appertains to make and use the same.

The present invention relates to resilient suspensions for vehicle bodies and consists in the combinations and arrangements of elements hereinafter described and particularly set forth in the accompanying claims.

The purpose of the invention is to provide the body of a vehicle, especially of the motor driven type, with resilient means for indirectly absorbing and dissipating all shocks or jars to which the vehicle wheel is subjected, and without causing undue strain on either the wheel or its axle or transmitting excessive vibration to the supported load.

Another object of the resilient suspension as proposed herein is the employment of apparatus and disposal of the elements thereof in such a manner as will secure the maximum stability of the resilient sustaining structure, and equitable location or distribution of the resilient devices per se with regard to the chassis or frame on which the same are mounted.

The different constructions herein shown are proposed as modifications of those types of vehicle body suspension forming the subject-matter of my co-pending application for U. S. Patent Serial No. 365,037, and filed March 11, 1920.

Figure 1:
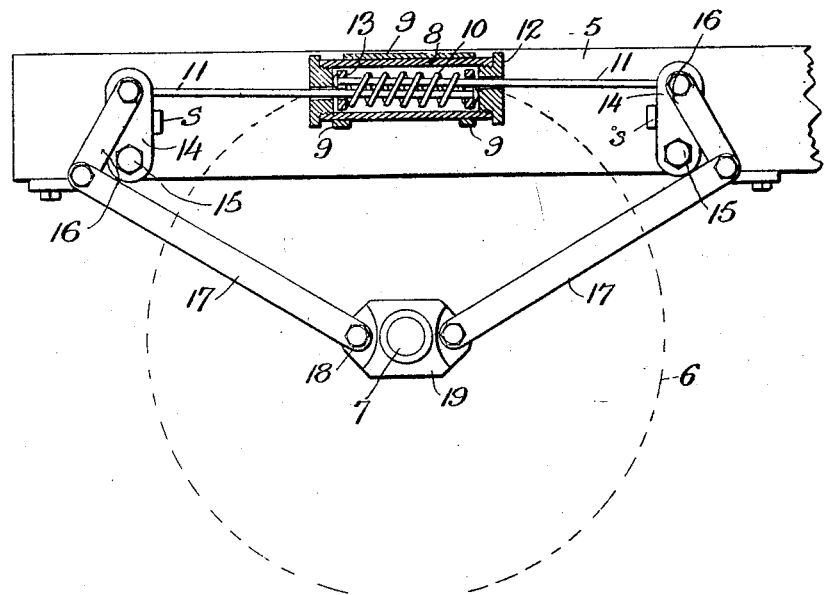
Figure 2:
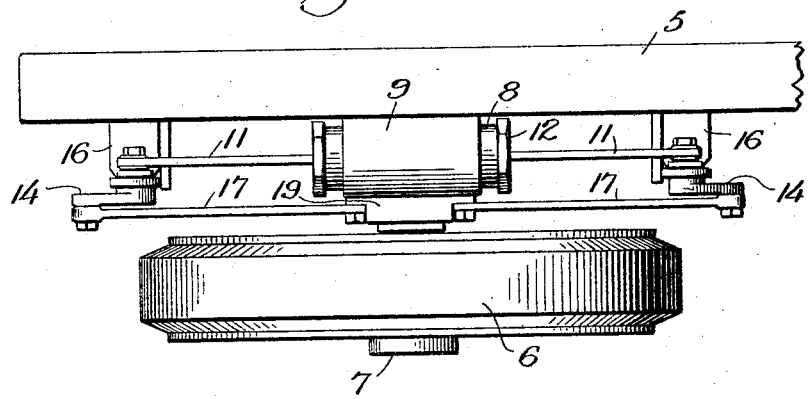

The invention is disclosed by way of illustration in the accompanying drawings, wherein:

Figure 1 is a side elevational view showing a vehicle chassis or frame equipped with the appliance; and Figure 2 is a top plan view thereof.

Referring to the construction in further detail, and wherein like reference characters designate corresponding parts in the different figures shown, the apparatus consists of the chassis or frame 5 of the vehicle having the usual wheel 6 journaled on the axle 7; and 8 designates a cylindrical casing contained within the supporting sleeve 9 disposed laterally of the vehicle as shown.

A resilient element, consisting preferably of a spiral spring 10, is located within the cylinder 8 and cooperates with a pair of compression rods 11 that pass through the open cylinder heads 12 and engage with plungers 13 and of which there is one at each end of the cylinder.

A pair of lever arms 14 are fulcrumed on the chassis 5, as at 15, and are connected with said compression rods 11. A pair of depending links 16 are connected to the free ends of the lever arms 14, and at their lower ends are pivotally connected to the pair of reach rods 17. Said reach rods have pivotal connections, as at 18, with the journal box 19 of the axle 7, and operate to transmit rocking motion to the link pairs (14 and 16), and thereby work the compression rods against the spring 10 through the relative up and down movements of the axle and chassis.

The lever arm may be constructed of spring metal or formed of a plurality of leaves of spring steel in lieu of a rigid lever arm. This construction will give additional resiliency to the suspension of the vehicle body and at the same time afford the necessary strength to the supporting structure.

It is obvious that those skilled in the art may vary the details of construction and arrangement of parts without departing from the spirit of my invention, and therefore I do not wish to be limited to such features except as may be required by the claims.

Having thus described the invention, what is claimed as new is:

1. In a resilient suspension for vehicle bodies, the combination with a chassis, an axle, and a wheel journaled thereon, of a spring mounted on the vehicle body, a pair of oppositely acting compression rods connected to said spring at its respective ends, lever arms fulcrumed on the vehicle body and connected to the compression rods, and reach rods and links connecting the axle with said lever arms, substantially as set forth.

2. In a resilient suspension for vehicle bodies, the combination with a chassis, an axle, and a wheel journaled thereon, of a cylinder mounted on the chassis, a compression spring located in the cylinder, a pair of oppositely acting compression rods connected to said spring, lever arms fulcrumed on the chassis at opposite ends of the cylinder and connected to the compression rods, and reach rods and links connecting the axle with said lever arms, substantially as set forth.

3. In a resilient suspension for vehicle bodies, the combination with a chassis, an axle, and a wheel journalled thereon, of a single spring mounted on the chassis immediately over the axle, a pair of oppositely acting compression rods connected to said spring at its respective ends, lever arms fulcrumed on the vehicle body and connected to the compression rods, and reach rods and links connecting the axle with said lever arms, substantially as set forth.

4. In a resilient suspension for vehicle bodies, the combination with a chassis, an axle, and a wheel journalled thereon, of a spring mounted on the chassis immediately over the axle, a pair of oppositely acting compression rods connected to said spring at its respective ends, upright lever arms fulcrumed on the chassis and connected to the compression rods, links dependingly connected to said lever arms, and reach rods connecting said links with the axle, substantially as set forth.

5. In a resilient suspension for vehicle bodies, the combination with a chassis, an axle, and a wheel journalled thereon, of a spring mounted on the chassis immediatelly over the axle, a pair of oppositely acting compression rods passing through said spring and connected thereto at its respective ends, upright lever arms fulcrumed on the chassis and connected to said compression rods, links dependingly connected to said lever arms, and reach rods connecting said links with the axle, substantially as set forth.

In testimony whereof I affix my signature.

BENJAMIN F. SEYMOUR.